United States Patent
Yoshida et al.

(10) Patent No.: US 10,611,905 B2
(45) Date of Patent: Apr. 7, 2020

(54) CROSSLINKABLE RESIN COMPOSITION, CROSSLINKED PRODUCT, AND METHOD FOR PRODUCING THEREOF, AND MULTILAYERED STRUCTURE

(71) Applicant: KURARAY CO., LTD., Kurashiki-shi (JP)

(72) Inventors: Kentaro Yoshida, Kurashiki (JP); Shinji Tai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 54 days.

(21) Appl. No.: 15/983,932

(22) Filed: May 18, 2018

(65) Prior Publication Data

US 2018/0340060 A1 Nov. 29, 2018

Related U.S. Application Data

(60) Provisional application No. 62/510,387, filed on May 24, 2017.

(51) Int. Cl.

| C08L 25/06 | (2006.01) |
| C08L 29/04 | (2006.01) |
| C08K 5/3492 | (2006.01) |
| C08L 23/08 | (2006.01) |
| C08F 216/06 | (2006.01) |
| C08F 210/02 | (2006.01) |

(52) U.S. Cl.
CPC .......... *C08L 29/04* (2013.01); *C08K 5/34924* (2013.01); *C08L 23/0853* (2013.01); *C08L 25/06* (2013.01); *C08F 210/02* (2013.01); *C08F 216/06* (2013.01); *C08L 23/08* (2013.01); *C08L 2205/02* (2013.01); *C08L 2205/025* (2013.01); *C08L 2205/03* (2013.01); *C08L 2207/04* (2013.01); *C08L 2312/06* (2013.01)

(58) Field of Classification Search
CPC ..... C08K 5/34924; C08K 5/025; C08L 25/06; C08L 29/04; C08L 23/0853; C08L 53/005; C08L 23/16; C08L 23/26; C08L 23/08; C08L 2205/02; C08L 2312/06; C08L 2205/03; C08L 2205/025; C08L 2207/04; C08F 210/02; C08F 216/06
See application file for complete search history.

(56) References Cited

U.S. PATENT DOCUMENTS

2015/0045511 A1* 2/2015 Tomoi ................ B29B 7/88
525/182

* cited by examiner

*Primary Examiner* — Nathan M Nutter
(74) *Attorney, Agent, or Firm* — Oblon, McCelland, Maier & Neustadt, L.L.P.

(57) ABSTRACT

An object is to provide a crosslinkable resin composition capable of forming a crosslinked product that has excellent hot water resistance and bending resistance.
The present invention provides a resin composition containing an ethylene-vinyl alcohol copolymer (A), a flexible resin (B), and a crosslinking agent (C) having two or more polymerizable groups, with the crosslinking agent (C) in an amount of 0.5 to 10 parts by mass relative to a total 100 parts by mass of the ethylene-vinyl alcohol copolymer (A) and the flexible resin (B), the flexible resin (B) being a styrene thermoplastic elastomer or an α-olefin polymer, and the resin composition having a mass ratio [(A)/(B)] between the ethylene-vinyl alcohol copolymer (A) and the flexible resin (B) of 90/10 to 65/35.

19 Claims, No Drawings

CROSSLINKABLE RESIN COMPOSITION, CROSSLINKED PRODUCT, AND METHOD FOR PRODUCING THEREOF, AND MULTILAYERED STRUCTURE

This application claims priority under 35 U.S.C. § 119 from U.S. Provisional Application Ser. No. 62/510,387 (filed 24 May 2017), the disclosure of which is incorporated by reference herein for all purposes as if fully set forth

TECHNICAL FIELD

The present invention relates to a resin composition, a crosslinked product, and a method for producing the resin composition and the crosslinked product, and a multilayered structure.

BACKGROUND ART

Ethylene-vinyl alcohol copolymers (hereinafter, also merely referred to as "EVOH") have an extremely small amount of oxygen transmission in comparison with other plastics and exhibit favorable melt moldability, and therefore have been widely used as food packaging materials and other packaging materials. However, when packaging materials produced using, for example, EVOH are subjected to a retort treatment or used under high-temperature and high-humidity conditions for a long period of time, there are cases of whitening or deformation of the packaging materials or a decrease in barrier properties of the packaging materials, and thus further improvement in hot water resistance is being demanded.

As a strategy for improving the hot water resistance, various techniques have been proposed in which EVOH is crosslinked using an activated energy ray such as an electron beam. For example, Patent Literature 1 discloses a method for melting and kneading EVOH with triallyl cyanurate or triallyl isocyanurate used as a crosslinking agent and then crosslinking the EVOH by irradiation with an electron beam.

In addition, Patent Literature 2 discloses a procedure of adding a compound having two or more allyl ether groups to EVOH and crosslinking the EVOH by irradiation with an electron beam.

Further, Patent Literature 3 discloses a method for modifying EVOH with an epoxy compound having a double bond and an epoxy compound not having a double bond, and crosslinking at least a part of the resultant modified EVOH by irradiation with an electron beam.

Furthermore, Patent Literature 4 discloses a procedure of adding an amide compound having a plurality of double bonds to EVOH and crosslinking the EVOH by irradiation with an electron beam.

CITATIONS LIST

Patent Literatures

Patent Literature 1: JP S62-252409 A
Patent Literature 2: JP H09-234833 A
Patent Literature 3: WO 2007/123108 A
Patent Literature 4: WO 2011/111802 A

SUMMARY OF INVENTION

Technical Problems

The strategies of Patent Literatures 1 to 4, however, are capable of improving the hot water resistance but provides a crosslinked product that is rigid and brittle due to high crystallinity of EVOH and formation of a crosslinked structure by electron beam irradiation, thus giving a demerit of easily generating pinholes and cracks by physical load such as bending. Further, a packing material into which EVOH is processed is repetitively subjected to bending in processes of transportation and storage, limiting an application range of a resultant crosslinked product.

The present invention has been made in view of the foregoing circumstances, and an object of the present invention is to provide a resin composition capable of forming a crosslinked product excellent in hot water resistance and bending resistance.

Solutions to Problems

The present inventors have conducted intensive study to solve the foregoing problems and thus found that a resin composition containing EVOH, a specific flexible resin, and a crosslinking agent at an appropriate ratio is subjected to electron beam irradiation to give a crosslinked product excellent in hot water resistance and bending resistance. Thus, the following present invention has been completed:
(1) a resin composition containing an ethylene-vinyl alcohol copolymer (A), a flexible resin (B), and a crosslinking agent (C) having two or more polymerizable groups, with the crosslinking agent (C) in an amount of 0.5 to 10 parts by mass relative to a total 100 parts by mass of the ethylene-vinyl alcohol copolymer (A) and the flexible resin (B),
the flexible resin (B) being a styrene thermoplastic elastomer, an α-olefin polymer, or a combination thereof, and
the resin composition having a mass ratio [(A)/(B)] between the ethylene-vinyl alcohol copolymer (A) and the flexible resin (B) of 90/10 to 65/35;
(2) the resin composition according to (1), wherein the flexible resin (B) is a mixture of an acid-modified flexible resin (b1) with an unmodified flexible resin (b2), and the flexible resin (B) has a mass ratio [(b1)/(b2)] between the acid-modified flexible resin (b1) and the unmodified flexible resin (b2) of 99/1 to 1/99;
(3) the resin composition according to (1) or (2), wherein the crosslinking agent (C) has three or more polymerizable groups;
(4) the resin composition according to any one of (1) to (3), wherein the crosslinking agent (C) is a triazine derivative;
(5) the resin composition according to (4), wherein the triazine derivative is triallyl cyanurate, triallyl isocyanurate, trimethallyl isocyanurate, or a polymer thereof;
(6) the resin composition according to any one of (1) to (3), wherein the crosslinking agent (C) has as many amide groups as or more amide groups than the polymerizable groups;
(7) the resin composition according to (6), wherein the crosslinking agent (C) is represented by the following formula (1):

[Formula 1]

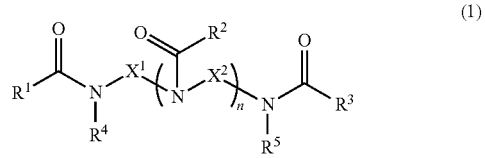

(in the formula (1), $R^1$, $R^2$, and $R^3$ are each independently an unsaturated hydrocarbon group having 2 to 8 carbon atoms; $R^4$ and $R^5$ are each independently a hydrogen atom or an alkyl group having 1 to 4 carbon atoms; $X^1$ and $X^2$ are each independently an alkanediyl group having 1 to 6 carbon atoms; n is an integer of 0 to 4; and when n is an integer of no less than 2, a plurality of $R^e$s are each independently an unsaturated hydrocarbon group having 2 to 8 carbon atoms and a plurality of $X^2$s are each independently an alkanediyl group having 1 to 6 carbon atoms);

(8) the resin composition according to any one of (1) to (7), further containing a hindered phenol compound (D) having an ester bond or an amide bond in an amount of 0.2 to 5 parts by mass relative to the total 100 parts by mass of the ethylene-vinyl alcohol copolymer (A) and the flexible resin (B);

(9) the resin composition according to (8), wherein the hindered phenol compound (D) has the amide bond;

(10) the resin composition according to any one of (1) to (9), being for crosslinking with an activated energy ray;

(11) a crosslinked product obtained from the resin composition according to any one of (1) to (10);

(12) a film formed of the crosslinked product according to (11);

(13) a multilayered structure including a layer formed of the crosslinked product according to (11);

(14) a retort container including the multilayered structure according to (13); and

(15) a method for producing a crosslinked product, the method including a step of irradiating the resin composition according to (10) with an activated energy ray.

These and other embodiments, features and advantages of the present invention will be more readily understood by those of ordinary skill in the art from a reading of the following detailed description.

DETAILED DESCRIPTION

The present invention relates to a resin composition comprising an EVOH used for a film. It is particularly concerned with excellent in hot water resistance and bending resistance. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by mass.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

Advantageous Effects of Invention

A resin composition of the present invention can economically provide a crosslinked product excellent in hot water resistance and bending resistance, so that it is possible to apply the resin composition to various packing materials.

MODE FOR CARRYING OUT INVENTION

<Resin Composition>

A resin composition of the present invention contains EVOH (A), a flexible resin (B), and a crosslinking agent (C), and may also contain another additive as necessary. The resin composition of the present invention contains the crosslinking agent (C) having two or more polymerizable groups in a specific ratio to the total of the EVOH (A) and the flexible resin (B) to efficiently produce a crosslinked product by irradiation with an activated energy ray such as an electron beam. Further, the resin composition contains the EVOH (A) and the flexible resin (B) that is specific at a specific ratio to give a crosslinked product excellent in bending resistance. Hereinafter, each component is described.

<Ethylene-Vinyl Alcohol Copolymer (A)>

The EVOH (A) is a main component of the resin composition of the present invention. The EVOH (A) is a copolymer having as a main structural unit an ethylene unit and a vinyl alcohol unit. This EVOH (A) may have, in addition to the ethylene unit and the vinyl alcohol unit, one or a plurality of other structural units. This EVOH (A) is generally obtained by polymerizing ethylene with a vinyl ester to give an ethylene-vinyl ester copolymer and saponifying the ethylene-vinyl ester copolymer.

The EVOH (A) has as a lower limit an ethylene unit content (that is, a proportion of the number of ethylene units to the total number of monomer units in the EVOH (A)) of preferably 20 mol %, more preferably 22 mol %, and still more preferably 24 mol %. On the other hand, the EVOH (A) has as an upper limit an ethylene unit content of preferably 60 mol %, more preferably 55 mol %, and still more preferably 50 mol %. The EVOH (A) having an ethylene unit content of less than 20 mol % decreases oxygen barrier properties in high humidity and sometimes deteriorates melt moldability. In contrast, the EVOH (A) having an ethylene unit content of greater than 60 mol % cannot sometimes give sufficient oxygen barrier properties. The EVOH (A) has as a lower limit a degree of saponification (that is, a proportion of the number of vinyl alcohol units to the total number of the vinyl alcohol units and vinyl ester units in the EVOH (A)) of preferably 80 mol %, more preferably 95 mol %, and still more preferably 99 mol %. On the other hand, the EVOH (A) has as an upper limit a degree of saponification of preferably 100 mol % and more preferably 99.99 mol %. The EVOH (A) having a degree of saponification of less than 80 mol % cannot sometimes give sufficient oxygen barrier properties and, to make matters worse, possibly makes thermal stability insufficient.

When the EVOH (A) is composed of a mixture of two or more types of EVOH that are different in ethylene unit content, an average value calculated from a mixing mass ratio is defined as the ethylene unit content. In this case, the difference between two types of EVOH that have most different ethylene unit contents is preferably no greater than 30 mol %. The difference in ethylene unit content is more preferably no greater than 20 mol % and still more preferably no greater than 15 mol %. Similarly, when the EVOH (A) is composed of a mixture of two or more types of EVOH that are different in degree of saponification, an average value calculated from a mixing mass ratio is defined as the degree of saponification of the mixture. In this case, the difference in degree of saponification between two types of EVOH having most different degrees of saponification is preferably no greater than 7% and more preferably no greater than 5%. When the resin composition containing the EVOH (A) is desired to achieve a balance between thermal moldability and oxygen barrier properties at a higher level, it is preferred to use the EVOH (A) that is obtained by mixing EVOH having an ethylene unit content of no less than 24 mol % and less than 34 mol % and a degree of saponification of no less than 99% with EVOH having an ethylene unit content of no less than 34 mol % and less than 50 mol % and a degree of saponification of no less than 99% in a blending mass ratio of 60/40 to 90/10.

The ethylene unit content and the degree of saponification of the EVOH (A) can be acquired by nuclear magnetic resonance (NMR) analysis.

The EVOH (A) has as a lower limit a melt flow rate in accordance with JIS K 7210: 2014 (hereinafter, also merely referred to as "MFR"; temperature 210° C., load 2160 g) of preferably 0.1 g/10 min, more preferably 0.5 g/10 min, and still more preferably 1 g/10 min. On the other hand, the EVOH has as an upper limit an MFR of preferably 50 g/10 min, more preferably 30 g/10 min, and still more preferably 15 g/10 min. The EVOH (A) having an MFR value in the above range improves melt kneadability and melt moldability of a resultant resin composition.

The EVOH (A) can also contain, as a copolymer unit, a small amount of another monomer unit other than the ethylene unit and the vinyl alcohol unit within a range not to inhibit the purpose of the present invention. Examples of such a monomer include the following compounds, for example: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri(β-methoxyethoxy)silane, and γ-methacryloxypropyltrimethoxysilane; unsaturated sulfonic acids or salts thereof; unsaturated thiols; and vinylpyrrolidones.

<Flexible Resin (B)>

Used as the flexible resin (B) is a styrene thermoplastic elastomer, an α-olefin copolymer, or a combination thereof, and preferred is a styrene thermoplastic elastomer or an α-olefin copolymer. These resins can be used as the flexible resin (B) to improve the bending resistance of a resultant crosslinked product.

(Styrene Thermoplastic Elastomer)

The styrene thermoplastic elastomer is not particularly limited, and a publicly known product can be used. The styrene thermoplastic elastomer generally has as a hard segment a styrene monomer polymer block (Hb) and as a soft segment a conjugated diene compound polymer block or a hydrogenated block thereof (Sb). A structure of this styrene thermoplastic elastomer may be a diblock structure represented by Hb-Sb, a triblock structure represented by Hb-Sb-Hb or Sb-Hb-Sb, a tetrablock structure represented by Hb-Sb-Hb-Sb, or a polyblock structure having a total 5 or more blocks of Hbs and Sbs that are linearly bonded.

A styrene monomer used as the styrene monomer polymer block (Hb) is not particularly limited, and examples of the styrene monomer include styrene and derivatives thereof. Specific examples include styrene such as styrene, α-methyl styrene, 2-methyl styrene, 4-methyl styrene, 4-propyl styrene, 4-t-butyl styrene, 4-cyclohexylstyrene, 4-dodecyl styrene, 2-ethyl-4-benzyl styrene, 4-(phenylbutyl)styrene, 2,4,6-trimethylstyrene, monofluorostyrene, difluorostyrene, monochlorostyrene, dichlorostyrene, methoxystyrene, and t-butoxystyrene; vinyl group-containing aromatic compounds such as vinyl naphthalenes (e.g., 1-vinylnaphthalene and 2-vinylnaphthalene); and vinylene group-containing aromatic compounds such as indene and acenaphthylene. Especially, styrene is preferred. The styrene monomers may be used singly or in combination of two or more thereof.

A conjugated diene compound used as the conjugated diene compound polymer block (Sb) is not also particularly limited. Examples of such a conjugated diene compound include butadiene, isoprene, 2,3-dimethylbutadiene, pentadiene, and hexadiene. Especially, butadiene is preferred. The conjugated diene compounds may be used singly or in combination of two or more thereof. Further, the conjugated diene compound can be copolymerized with another comonomer, for example, ethylene, propylene, butylene, or styrene. Alternatively, the conjugated diene compound polymer block (Sb) may be a hydrogenated product that is partially or completely hydrogenated.

The styrene thermoplastic elastomer has a content rate of a styrene monomer polymer block unit (Hb) of generally no less than 5% by mass and no greater than 80% by mass, and preferably no less than 10% by mass and no greater than 50% by mass and more preferably no less than 20% by mass and no greater than 40% by mass in light of improving the bending resistance of a resultant crosslinked product.

The styrene thermoplastic elastomer has a content rate of a conjugated diene compound polymer block and/or a hydrogenated block thereof (Sb) of generally no less than 20% by mass and no greater than 95% by mass, and preferably no less than 50% by mass and no greater than 90% by mass and more preferably no less than 60% by mass and no greater than 80% by mass in light of improving the bending resistance of a resultant crosslinked product.

Specific examples of the styrene thermoplastic elastomer include a styrene-isoprene diblock copolymer (SI), a styrene-butadiene diblock copolymer (SB), a styrene-isoprene-styrene triblock copolymer (SIS), a styrene-butadiene/isoprene-styrene triblock copolymer (SB/IS), and a styrene-butadiene-styrene triblock copolymer (SBS) as well as hydrogenated products thereof. Particularly, preferred are a hydrogenated product of a styrene-isoprene diblock copolymer (SEP), a hydrogenated product of a styrene-butadiene diblock copolymer (SEB), a hydrogenated product of a styrene-isoprene-styrene triblock copolymer (SEPS), a hydrogenated product of a styrene-butadiene/isoprene-styrene triblock copolymer (SEEPS), and a hydrogenated product of a styrene-butadiene-styrene triblock copolymer (SEBS) in light of being excellent in, for example, weather resistance, and particularly preferred is a hydrogenated product of a styrene-butadiene-styrene triblock copolymer (SEBS) in light of improving the bending resistance of a resultant crosslinked product.

(α-Olefin Copolymer)

The α-olefin copolymer is not particularly limited, and examples thereof include an ethylene-propylene copolymer (EP), an ethylene-butene copolymer (EB), a propylene-butylene copolymer (PB), and a butylene-ethylene copolymer (BE). Especially, an ethylene-propylene copolymer (EP) or an ethylene-butene copolymer (EB) is preferred in light of improving the bending resistance of a resultant crosslinked product.

The flexible resin (B) used in the present invention is preferably a mixture of an acid-modified flexible resin (b1) with an unmodified flexible resin (b2) in light of further increasing the melt moldability and the bending resistance of a resultant crosslinked product.

The acid-modified flexible resin (b1) used in the present invention is a product obtained by subjecting the styrene thermoplastic elastomer or the α-olefin copolymer to acid modification. Here, the acid modification is performed by copolymerizing monomers that constitute the α-olefin copolymer or the styrene thermoplastic elastomer with a part of the monomers substituted with an α,β-unsaturated carboxylic acid or an anhydride monomer thereof, or by introducing an α,β-unsaturated carboxylic acid or an anhydride thereof to a part of a side chain of the styrene thermoplastic elastomer or the α-olefin copolymer through, for example, a grafting reaction such as radical addition.

Examples of the α,β-unsaturated carboxylic acid or the anhydride thereof used for the acid modification include maleic acid, acrylic acid, itaconic acid, crotonic acid, maleic anhydride, and itaconic anhydride. Especially, maleic anhydride is suitably used.

The acid-modified flexible resin (b1) has an acid value of preferably no greater than 50 mg KOH/g, more preferably no less than 1 mg KOH/g and no greater than 30 mg KOH/g, and still more preferably no less than 2 mg KOH/g and no greater than 20 mg KOH/g. The acid-modified flexible resin (b1) having an acid value of greater than 50 mg KOH/g increases a reaction point with a hydroxy group in the EVOH (A) and generates a highly polymerized product in a melt kneading process to be likely to decrease the melt moldability and the thermal stability. On the other hand, the acid-modified flexible resin (b1) having an excessively low acid value decreases compatibility with the EVOH (A) not to give sufficient bending resistance. In the present specification, the acid value of the acid-modified flexible resin (b1) is calculated by dissolving the acid-modified flexible resin (b1) in xylene and dropping a 0.05 mol/L solution of potassium hydroxide-ethanol, with phenolphthalein used as an indicator.

The unmodified flexible resin (b2) used in the present invention is the styrene thermoplastic elastomer, the α-olefin copolymer, or a combination thereof.

The flexible resin (B) has as melt viscosity an MFR in accordance with JIS K 7210: 2014 (under 210° C. and a load of 2160 g) of preferably 1.0 to 100 g/10 min and more preferably 2.0 to 60 g/10 min. Use of the flexible resin (B) having such a melt viscosity can further increase the melt moldability and the bending resistance of a resultant crosslinked product.

A difference in melt viscosity (MFR under 210° C. and a load of 2160 g) between the EVOH (A) and the flexible resin (B) is preferably no greater than 30 g/10 min and more preferably no greater than 10 g/10 min. As described above, it is easier to melt knead the EVOH (A) and the flexible resin (B) as the EVOH (A) and the flexible rein (B) have closer melt viscosities, so that a state is easily provided in which the flexible resin (B) is finely dispersed in the EVOH (A). Such a resin composition can further increase the bending resistance of a resultant crosslinked product.

The resin composition of the present invention has a mass ratio [(A)/(B)] between the EVOH (A) and the flexible resin (B) of necessarily 90/10 to 65/35 and more preferably 90/10 to 75/25 to improve the bending resistance of a resultant crosslinked product. The resin composition having a [(A)/(B)] of greater than 90/10 sometimes gives a crosslinked product insufficient in bending resistance. The resin composition having a [(A)/(B)] of less than 65/35 sometimes gives insufficient oxygen barrier properties.

In the resin composition of the present invention, the flexible resin (B) may be the acid-modified flexible resin (b1) alone but is preferably a mixture of the acid-modified flexible resin (b1) with the unmodified flexible resin (b2). The flexible resin (B) used as a mixture has a mass ratio [(b1)/(b2)] between the acid-modified flexible resin (b1) and the unmodified flexible resin (b2) of preferably 99/1 to 1/99, more preferably 67/33 to 5/95, and still more preferably 50/50 to 10/90 in light of improving the bending resistance of a resultant crosslinked product. The flexible resin (B) having a [(b1)/(b2)] of greater than 99/1 sometimes decreases, for example, the melt moldability and the thermal stability of the resin composition. The flexible resin (B) having a [(b1)/(b2)] of less than 1/99 becomes insufficient in compatibility with the EVOH (A), making it difficult to give a sea-island structure in which the flexible resin (B) is finely dispersed in the EVOH (A), to give a crosslinked product insufficient in bending resistance.

In the resin composition of the present invention, the acid-modified flexible resin (b1) used as the flexible resin (B) is considered not only to have high compatibility with the EVOH (A) but also to play a role of a compatibilizing agent between the EVOH (A) and the unmodified flexible resin (b2). When the resin composition of the present invention is kneaded and prepared by a biaxial extruder, an acid contained in the acid-modified flexible resin (b1) reacts with a hydroxy group in the EVOH (A) to generate a graft polymer of the EVOH (A) with the acid-modified flexible resin (b1) in the extruder. This graft polymer has compatibility with the EVOH (A) and further exhibits a compatibilizing effect with the unmodified flexible resin (b2). This makes the flexible resin (B) finely dispersed in the EVOH (A) to improve the bending resistance of a resultant crosslinked product.

On the other hand, the generation of the graft polymer increases entanglement of molecular chains, so that the resin composition of the present invention is likely to have a lower MFR in accordance with JIS K 7210: 2014 (under 210° C. and a load of 2160 g) than the MFR of the EVOH (A) as a base. The resin composition of the present invention satisfies a condition of an MFR of preferably no greater than $2/3$, more preferably $1/10$ to $3/5$, and still more preferably $1/5$ to $1/2$ the MFR of the EVOH (A) as a base in light of giving a sufficient compatibilizing effect and ameliorating dispersibility of the flexible resin (B) in the EVOH (A). The resin composition of the present invention having an MFR of less than $1/10$ the MFR of the EVOH (A) as a base sometimes decreases the melt moldability. On the other hand, the resin composition of the present invention having an MFR of greater than $2/3$ the MFR of the EVOH (A) as a base gives insufficient generation of a graft polymer, making it difficult to give a sea-island structure in which the flexible resin (B) is finely dispersed in the EVOH (A), to give a crosslinked product insufficient in bending resistance.

The resin composition used in the present invention makes a sea-island structure having the EVOH (A) as a matrix phase and the flexible resin (B) as a dispersed phase. The resin composition having such a sea-island structure gives a crosslinked product that attains both the bending resistance and the oxygen barrier properties.

<Crosslinking Agent (C)>

The crosslinking agent (C) has two or more polymerizable groups. For the purpose of suppressing bleeding out, the crosslinking agent (C) has a melting point or a softening temperature of preferably no less than 40° C., more preferably no less than 50° C., and still more preferably no less than 60° C. In addition, for the purpose of facilitating mixing with the EVOH, the crosslinking agent (C) has a melting point or a softening temperature of preferably no greater than 200° C., more preferably no greater than 150° C., and still more preferably no greater than 120° C. The crosslinking agent (C) has a boiling point and a thermal decomposition temperature of preferably no less than 200° C., more preferably no less than 240° C., and still more preferably no less than 260° C. A high boiling point and thermal decomposition temperature suppress loss of a compound during melt kneading and melt molding to easily give a sufficient crosslinking effect.

The polymerizable groups included in the crosslinking agent (C) are not particularly limited as long as they cause a crosslinking reaction with the EVOH (A), and examples of the polymerizable groups include an unsaturated hydrocarbon group, a carboxyl group, an epoxy group, and an isocyanate group. Especially, an unsaturated hydrocarbon group is preferred because it allows easy crosslinking with an activated energy ray.

The unsaturated hydrocarbon group is not particularly limited as long as it is a group having at least one of an ethylenic unsaturated bond and an acetylenic unsaturated bond, and examples of such an unsaturated hydrocarbon group include an alkenyl group, an alkadienyl group, an alkatrienyl group, an arylalkenyl group, an alkynyl group, an alkadiynyl group, and an alkatriynyl group. The number of carbon atoms in the unsaturated hydrocarbon group is generally 2 to 12, more preferably 2 to 10, still more preferably 2 to 8, and particularly preferably 3 to 8.

Examples of the alkenyl group include linear alkenyl groups such as a vinyl group, a propenyl group (allyl group), a butenyl group, a pentenyl group, a hexenyl group, a heptenyl group, an octenyl group, a nonenyl group, and a decenyl group; branched chain alkenyl groups such as a 2-propenyl group, a 1-methylpropenyl group, and a 2-methylpropenyl group; and cyclic alkenyl groups such as a cyclobutenyl group, a cyclopentenyl group, and a cyclohexenyl group.

Examples of the alkadienyl group include linear alkadienyl groups such as a pentadienyl group, a hexadienyl group, a heptadienyl group, and an octadienyl group; and branched chain alkadienyl groups such as a 1-methylpentadienyl group and a 2-methylpentadienyl group.

Examples of the alkatrienyl group include linear alkatrienyl groups such as a hexatrienyl group, a heptatrienyl group, and an octatrienyl group; and branched chain alkatrienyl groups such as a 1-methylhexatrienyl group and a 2-methylhexatrienyl group.

Examples of the arylalkenyl group include a phenylvinyl group and a phenylpropenyl group.

Examples of the alkynyl group include linear alkynyl groups such as a propynyl group, a butynyl group, a pentynyl group, a hexynyl group, a heptynyl group, and an octynyl group; and branched chain alkynyl groups such as a 1-methylpropynyl group and a 2-methylbutynyl group.

Examples of the alkadiynyl group include linear alkadiynyl groups such as a pentadiynyl group, a hexadiynyl group, a heptadiynyl group, and an octadiynyl group; and branched chain alkadiynyl groups such as a 1-methylpentadiynyl group and a 2-methylhexadiynyl group.

Examples of the alkatriynyl group include linear alkatriynyl groups such as a hexatriynyl group, a heptatriynyl group, and an octatriynyl group; and branched chain alkatriynyl groups such as a 1-methylheptatriynyl group and a 2-methyloctatriynyl group.

A part or all the hydrogen atoms of the unsaturated hydrocarbon group may be substituted with a substituent that may have a hetero atom. The hetero atom in this case is not particularly limited as long as it is an atom other than a carbon atom and a hydrogen atom, and examples of the hetero atom include a halogen atom, an oxygen atom, a sulfur atom, and a nitrogen atom. Examples of the halogen atom include a fluorine atom, a chlorine atom, an iodine atom, and a bromine atom. Specific examples of the substituent that has a hetero atom include an alkoxy group, a halogen atom, a hydroxy group, an oxygen atom (=O), and a cyano group. The alkoxy group is preferably an alkoxy group having 1 to 5 carbon atoms, preferably a methoxy group, an ethoxy group, an n-propoxy group, an iso-propoxy group, an n-butoxy group, and a tert-butoxy group, and more preferably a methoxy group and an ethoxy group.

Especially, as the polymerizable groups, a vinyl group, an alkenyl group having 3 to 8 carbon atoms, or an alkadienyl group is preferred, a vinyl group or an alkenyl group having 3 to 6 carbon atoms is more preferred, and a vinyl group or an alkenyl group having 3 to 5 carbon atoms is still more preferred. The polymerizable groups of the crosslinking agent (C) can be limited to these specific groups to smoothly and sufficiently progress a crosslinking reaction of the crosslinking agent (C) with the EVOH (A). In order to give a sufficient crosslinking effect, the crosslinking agent (C) preferably has three or more polymerizable groups.

In one aspect of the present invention, the crosslinking agent (C) is preferably a triazine derivative. The crosslinking agent (C) has a thermally stable triazine structure to considerably improve heat resistance of the crosslinking agent (C), so that decomposition of the crosslinking agent (C) during melt kneading and melt molding can be prevented, giving a crosslinked product having a sufficient crosslinking level. There are three triazine basic skeletons, i.e., a 1,2,3-triazine, a 1,2,4-triazine, and a 1,3,5-triazine. The triazine basic skeleton, however, is preferably a 1,3,5-triazine in terms of thermal stability and site symmetry of crosslinking moieties.

The crosslinking agent (C) that is a triazine derivative preferably has as many carbonyl groups as or more carbonyl groups than the polymerizable groups. The type of the carbonyl groups is not particularly limited, and the carbonyl groups are a partial structure of, for example, an aldehyde, a ketone, a carboxylic acid, an ester, an amide, and an enone. The carbonyl groups have an effect of improving compatibility between the crosslinking agent (C) and the EVOH (A) to smoothly and sufficiently progress a crosslinking reaction between the crosslinking agent (C) and the EVOH (A), so that bleeding out can be suppressed. The positions of the carbonyl groups in the crosslinking agent (C) are not particularly limited. The carbonyl groups, however, are preferably included in the triazine skeleton in terms of improving the thermal stability of the crosslinking agent (C) as well as effectively improving the compatibility of the crosslinking agent (C) with the EVOH (A), and preferable examples of such a case include a 1,3,5-triazine-2,4,6(1H,3H,5H)-trione structure.

The crosslinking agent (C) that is a triazine derivative preferably includes, as a specific structure, triallyl cyanurate, triallyl isocyanurate, trimethallyl isocyanurate, or a polymer thereof. While triallyl cyanurate and triallyl isocyanurate are liquid at room temperature, triallyl cyanurate and triallyl isocyanurate can be subjected to oligomerization or polymerization for solidification. Examples of a method for achieving these oligomerization and polymerization include a method for heat-treating triallyl cyanurate and triallyl isocyanurate for an appropriate period (for example, 1 to 7 days) at an appropriate temperature (for example, 50 to 120° C.) in the presence of oxygen, and a method for using a radical polymerization initiator such as an organic peroxide or an ultraviolet ray. Used as these oligomer and polymer are those having a molecular weight of about 500 to 100000 and preferably about 2000 to 50000, and a commercially available product having such a molecular weight range can be used as it is. These crosslinking agents are thermally stable and are favorable in efficiency of a crosslinking reaction by, for example, an activated energy ray. Further, triallyl isocyanurate is easily available and economically excellent. Especially, the crosslinking agent (C) preferably includes triallyl isocyanurate or trimethallyl isocyanurate in terms of giving particularly excellent efficiency of a crosslinking reaction and giving a crosslinked product particularly excellent in appearance. The crosslinking agent (C) particularly preferably includes trimethallyl isocyanurate in light of more effectively preventing the bleeding out of the crosslinking agent.

In another aspect of the present invention, the crosslinking agent (C) preferably includes as many amide groups as or more amide groups than the polymerizable groups. This can improve the compatibility of the crosslinking agent (C) with the EVOH (A) to thus improve efficiency of crosslinking by irradiation with an activated energy ray such as an electron beam and effectively prevent the bleeding out of the crosslinking agent.

When the crosslinking agent (C) having as many amide groups as or more amide groups than the polymerizable groups, the crosslinking agent (C) preferably has a structure represented by the following formula (1).

[Formula 1]

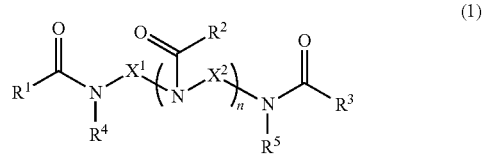

(In the formula (1), $R^1$, $R^2$, and $R^3$ are each independently an unsaturated hydrocarbon group having 2 to 8 carbon atoms. $R^4$ and $R^5$ are each independently a hydrogen atom or an alkyl group having 1 to 4 carbon atoms. $X^1$ and $X^2$ are each independently an alkanediyl group having 1 to 6 carbon atoms. n is an integer of 0 to 4. When n is an integer of no less than 2, a plurality of $R^2$s are each independently an unsaturated hydrocarbon group having 2 to 8 carbon atoms and a plurality of $X^2$s are each independently an alkanediyl group having 1 to 6 carbon atoms.)

The crosslinking agent (C) having a specific structure represented by the formula (1) can more improve the compatibility with the EVOH (A) to thus further improve the efficiency of crosslinking by irradiation with an activated energy ray such as an electron beam and more effectively prevent the bleeding out of the crosslinking agent (C).

In the crosslinking agent (C) represented by the formula (1), it is preferred in the formula (1) that $R^1$, $R^2$, and $R^3$ be each independently a vinyl group or an alkenyl group having 3 to 6 carbon atoms, $R^4$ and $R^5$ be hydrogen atoms, $X^1$ and $X^2$ be each independently an alkanediyl group having 1 to 3 carbon atoms, and n be 0 or 1. The crosslinking agent (C) having such a specific structure can further increase the compatibility with the EVOH (A) to sufficiently progress crosslinking of the EVOH (A) by the crosslinking agent (C) and thus suppress the bleeding out of the crosslinking agent.

The crosslinking agent (C) that is liquid at around room temperature can be impregnated into porous particles and handled as a powder. The porous particles are preferably any one of silica, alumina, diatom earth, and activated carbon. These porous particles have sufficient pore volume, so that they are suitable to be impregnated with the crosslinking agent (C). These porous particles are high in safety, so that they can be widely used for various packing materials.

A porous body is not particularly limited as long as it has sufficient specific surface area or pore volume and stably supports the crosslinking agent (C), and examples of the porous body include porous inorganic particles, porous organic particles, and composites thereof.

Examples of the porous inorganic particles include metal oxide particles (e.g., silica, alumina, zinc oxide, and titanium dioxide), metal hydroxide particles (e.g., aluminum hydroxide, calcium hydroxide, and magnesium hydroxide), metal sulfate particles (e.g., calcium sulfate and barium sulfate), metal nitride particles (e.g., silicon nitride), metal phosphate particles (e.g., calcium phosphate), metal silicate particles (e.g., calcium silicate, aluminum silicate, magnesium silicate, and magnesium aluminosilicate), mineral matter particles (e.g., zeolite, diatom earth, fired siliceous earth, talc, kaolin, sericite, bentonite, smectite, and clay), metal carbonate particles (e.g., magnesium carbonate and calcium carbonate), and carbonaceous particles (e.g., activated carbon and carbon). Examples of the porous organic particles include porous thermoplastic resin particles (e.g., porous olefin resin particles, porous styrene resin particles, porous polyamide resin particles, and porous acrylic resin particles) and porous thermosetting resin particles (e.g., a porous silicone resin and a porous polyurethane resin). The porous body of the present invention also includes, for example, aggregated particles having a steric structure where fine primary particles are chemically bonded to each other.

These porous bodies can be used singly or in combination of two or more thereof. Especially, porous inorganic particles are preferred in terms of supporting properties, heat resistance, and the like, metal oxide particles of, for example, silica or alumina, mineral matter particles of, for example, diatom earth, and carbonaceous particles of, for example, activated carbon are more preferred, and silica, alumina, and activated carbon are still more preferred. In addition, these porous bodies are high in safety, so that they can be widely used as various packaging materials.

The specific surface area and pore volume of the porous body may be acquired on the basis of a gas absorption method. A lower limit of the specific surface area is preferably 10 $m^2/g$, more preferably 50 $m^2/g$, and still more preferably 100 $m^2/g$. An upper limit of the specific surface area is preferably 3000 $m^2/g$, more preferably 2500 $m^2/g$, and still more preferably 2000 $m^2/g$. When the specific surface area falls within the above range, the efficiency of the porous body in supporting the crosslinking agent (C) is improved and a resultant resin composition becomes favorable in melt moldability. From the same reasons, the pore volume of the porous body is preferably no less than 0.50 ml/g, more preferably no less than 1.00 ml/g, and still more preferably no less than 1.50 ml/g.

An average particle diameter of the porous body may be acquired by averaging particle diameters of 100 particles observed with an electron microscope. A lower limit of the average particle diameter is preferably 0.01 μm, more preferably 0.05 μm, and still more preferably 0.1 μm. An upper limit of the average particle diameter is preferably 100 μm, more preferably 50 μm, and still more preferably 10 μm. When the average particle diameter falls within the above range, handleability of the crosslinking agent (C) as a powder is improved and a resultant crosslinked product becomes favorable in appearance.

A ratio between the crosslinking agent (C) and the porous particles is preferably 20/80 to 80/20 and more preferably 30/70 to 70/30. When the ratio falls within this range, the bleeding out of the crosslinking agent can be effectively suppressed and a sufficient crosslinking effect can be achieved. This ratio can be adjusted by controlling the amount of the crosslinking agent (C) impregnated into the porous particles. An impregnation method is not particularly limited, and examples thereof include a method for dropping little by little the crosslinking agent (C) to the porous particles to mix them together while the porous particles are stirred or vibrated. The amount of the crosslinking agent (C) to be impregnated into the porous particles is preferably no greater than 95% of the pore volume of the porous particles.

The usage of the crosslinking agent (C) in the resin composition of the present invention may be determined according to a degree of crosslinking required in a crosslinked product. A range of the usage, however, is 0.5 to 10 parts by mass and more preferably 1 to 8 parts by mass, relative to a total 100 parts by mass of the EVOH (A) and the flexible resin (B). When the usage of the crosslinking agent (C) falls within the above range, the crosslinking of the EVOH (A) can be sufficiently progressed to give a crosslinked product excellent in hot water resistance and suppress generation of appearance defects such as gel and granules.

<Hindered Phenol Compound (D)>

The hindered phenol compound (D) in the resin composition of the present invention is an optional component in the resin composition of the present invention and is characterized by having an ester bond or an amide bond. The hindered phenol compound refers to an organic compound having at least one phenol group whose aromatic moiety is substituted at at least one position, preferably both positions directly adjacent to a carbon atom having a phenolic hydroxyl group as a substituent. A substituent adjacent to the hydroxyl group may be appropriately selected from alkyl groups having 1 to 10 carbon atoms and is preferably a tertiary butyl group.

The hindered phenol compound (D) is preferably solid at around room temperature. For the purpose of suppressing the bleeding out, the hindered phenol compound (D) has a melting point or a softening temperature of preferably no less than 50° C., more preferably no less than 60° C., and still more preferably no less than 70° C. From the same reasons, the molecular weight of the hindered phenol compound (D) is preferably no less than 200, more preferably no less than 400, and still more preferably no less than 600. In addition, for the purpose of facilitating mixing with the EVOH (A), the hindered phenol compound (D) has a melting point or a softening temperature of no greater than 200° C., more preferably no greater than 190° C., and still more preferably no greater than 180° C.

The hindered phenol compound (D) preferably has an amide bond. The hindered phenol compound (D) having an amide bond gives particularly excellent effects of stabilizing viscosity of the EVOH (A) and preventing generation of gel.

Examples of a specific structure of the hindered phenol compound (D) include pentaerythritol tetrakis[3-(3,5-di-tert-butyl-4-hydroxyphenyl)propionate] commercially available as IRGANOX 1010 from BASF SE, stearyl 3-(3,5-di-tert-butyl-4-hydroxyphenyl)propionate commercially available as IRGANOX 1076, 2,2'-thiodiethylbis[3-(3,5-di-tert-butyl-4-hydroxyphenyl)propionate] commercially available as IRGANOX 1035, octadecyl 3-(3,5-di-tert-butyl-4-hydroxyphenyl)propanoate commercially available as IRGANOX 1135, ethylenebis(oxyethylene)bis(3-tert-butyl-4-hydroxy-5-methylbenzenepropanoate) commercially available as IRGANOX 245, 1,6-hexanediol bis[3-(3,5-di-tert-butyl-4-hydroxyphenyl)propionate] commercially available as IRGANOX 259, and N,N'-hexamethylene bis[3-(3,5-di-tert-butyl-4-hydroxyphenyl)propanamide] commercially available as IRGANOX 1098. Especially, the hindered phenol compound (D) is particularly preferably N,N'-hexamethylene bis[3-(3,5-di-tert-butyl-4-hydroxyphenyl)propanamide] commercially available as IRGANOX 1098, which has an amide bond.

The usage of the hindered phenol compound (D) in the resin composition of the present invention may be determined according to the conditions during melt kneading and melt molding, and the usage is preferably 0.2 to 5 parts by mass and more preferably 0.4 to 3 parts by mass, relative to the total 100 parts by mass of the EVOH (A) and the flexible resin (B). When the usage of the hindered phenol compound (D) falls within the above range, decomposition and crosslinking during melt kneading and melt molding can be prevented, so that the viscosity can be stably maintained for a long period of time. Further, generation of gel during melt kneading and melt molding can be prevented to produce a crosslinked product excellent in appearance.

<Other Components>

The crosslinkable resin composition may contain another component within a range not to impair the effects of the present invention. Examples of the other component include a boron compound, an alkali metal salt, a phosphoric acid compound, an oxidizable material, another polymer, a pro-oxidant, an antioxidant other than the hindered phenol compound (D), a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

<Boron Compound>

Addition of a boron compound to the resin composition of the present invention is advantageous in terms of improving melt viscosity of the EVOH and obtaining a homogenous coextrusion molded product or a coinjection molded product. Examples of the boron compound include boric acids, a boric acid ester, a boric acid salt, and boron hydrides. Specific examples of the boric acids include orthoboric acid (hereinafter, also merely referred to as "boric acid"), metaboric acid, and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is suitably 20 to 2000 ppm and more suitably 50 to 1500 ppm in terms of the boron element equivalent. The content of the boron compound in this range can give EVOH that is produced while torque variation is suppressed during heat melting. With a content of less than 20 ppm, such an effect is small, whereas with a content exceeding 1500 ppm, gelation is likely to occur, sometimes leading to inferior moldability.

<Alkali Metal Salt>

It is also effective to add to the resin composition of the present invention an alkali metal salt in an amount of suitably 5 to 5000 ppm in terms of the alkali metal element equivalent for improving interlayer adhesiveness and the compatibility. The added amount of the alkali metal salt is more suitably 20 to 1000 ppm and still more suitably 30 to 500 ppm in terms of the alkali metal element equivalent. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, potassium phosphate, sodium stearate, potassium stearate, and sodium salts of ethylene diamine tetraacetic acid. Especially, sodium acetate, potassium acetate, sodium phosphate, and potassium phosphate are suitable.

<Phosphoric Acid Compound>

It is also preferred to add to the resin composition of the present invention a phosphoric acid compound in an amount of suitably 1 to 500 ppm, more suitably 5 to 300 ppm, and still more suitably 10 to 200 ppm in terms of the phosphate radical equivalent. Blending the phosphoric acid compound in the above range can improve the thermal stability of the EVOH. In particular, generation of gel-state granules and coloring during melt molding for a long period of time.

The type of the phosphoric acid compound added to the resin composition of the present invention is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

<Crosslinked Product>

The resin composition of the present invention can be formed into a crosslinked product by externally imparted energy. The imparted energy allows the EVOH (A) in the resin composition to be crosslinked by the crosslinking agent (C). The crosslinking is preferably carried out by irradiation with at least one activated energy ray selected from the group consisting of an electron beam, an X-ray, a γ-ray, an ultraviolet ray, and a visible light ray, or by heating. Among the activated energy rays, crosslinking is preferably carried out by the electron beam in terms of sufficiently progressing a crosslinking reaction.

When the electron beam, the X-ray, or the γ-ray is used, the absorbed dose is preferably no less than 1 kGy, more preferably 1 kGy to 1 MGy, still more preferably 5 kGy to 500 kGy, and particularly preferably 10 kGy to 200 kGy. An absorbed dose of greater than 1 MGy may possibly cause decomposition of, for example, the EVOH, sometimes leading to problems such as a decrease in mechanical strength and coloring when the crosslinked product is made into a film form. Whereas an absorbed dose of less than 1 kGy does not improve the degree of crosslinking, so that intended performance such as hot water resistance cannot sometimes be obtained.

When irradiation with light is used, an irradiation period is affected by the thickness of a crosslinked product, the type of a light source, and other conditions, and the irradiation may be carried out for a period of at most several minutes, generally within 1 minute, and 1 second or shorter as the case may be, with use of, for example, a high-pressure mercury vapor lamp, a low-pressure mercury vapor lamp, a carbon arc lamp, a xenon lamp, a metal halide lamp, or an LED.

It is to be noted that the step of crosslinking the resin composition of the present invention may be determined to meet the features of a molded product intended, and the step may be carried out either before or after molding. Particularly, taking into consideration the degree of freedom in molding the resin composition, the crosslinking is preferably carried out after molding.

The crosslinked product of the present invention obtained as described above covers a broad range of uses. Suitable examples of the uses include an extrusion molded article, a film or a sheet (particularly, a stretched film or a thermally shrunk film), a thermoformed article, wallpaper or a decorative laminate board, a pipe or a hose, a profile molded article, an extrusion blow molded article, an injection molded article, a flexible packaging material, and a container (particularly, a retort packaging container). As a molded article having a multilayered structure described later, suitable examples include a coextruded film or a coextruded sheet, a thermally shrunk film, a multilayer pipe (particularly, a fuel pipe or a pipe for circulating hot water), a multilayer hose (particularly, a fuel hose), and a multilayer container (particularly, a coextrusion blow molded container, a coinjection molded container, and a retort packing container).

With regard to a molding method, for example, melt extrusion molding can provide a film, a sheet, a pipe, and the like, injection molding can provide a form of a container, and hollow molding can provide a bottle, etc.-shaped hollow container. Examples of the hollow molding include extrusion hollow molding of forming a parison by extrusion molding and blowing the parison for molding, and injection hollow molding of molding a preform by injection molding and blowing the preform for molding. Especially, it is suitable to use, for retort packaging materials, a method for molding a packaging material in a form of, for example, a multilayer film by melt extrusion molding, and a method for thermoforming a multilayer sheet molded by melt extrusion molding, into a container-shaped packaging material. In addition, it is preferred to use, depending on the use, a method for forming a parison by extrusion molding and blow molding the parison to provide a comparatively soft multilayer container-shaped packaging material.

<Multilayered Structure>

The multilayered structure of the present invention is obtained by laminating a layer of a crosslinked product obtained by the molding as described above with another layer.

With a layer formed of a polymer other than the resin composition of the present invention, a resin composition layer of the present invention, and an adhesive polymer layer defined as an "x layer," a "y layer," and a "z layer," respectively, there can be exemplified x/y, x/y/x, x/z/y, x/z/y/z/x, x/y/x/y/x, and x/z/y/z/x/z/y/z/x, as layer constructions of the multilayered structure. The layer construction, however, is not limited to these examples. When a plurality of x layers are provided, the types of the x layers may be the same or different. Also, a layer containing a recycled polymer formed of a scrap such as a trim generated during molding may be additionally provided, or alternatively a recycled polymer may be blended in a layer formed of another polymer. Although the construction of each layer in the multilayered structure in terms of the thickness is not particularly limited, the proportion of the thickness of the y layer to the total layer thickness is suitably 2 to 20% in light of moldability, cost, and the like.

The polymer used for the x layer is preferably a thermoplastic polymer in light of processability and the like. Examples of such a thermoplastic polymer include the following polymers, to which, however, the thermoplastic polymer is not limited: polyolefins such as polyethylene, polypropylene, an ethylene-propylene copolymer, an ethylene or propylene copolymer (a copolymer of ethylene or propylene with at least one of the following monomers: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, salts thereof, partial or complete esters thereof, nitriles thereof, amides thereof, and anhydrides thereof; carboxylic acid vinyl esters such as vinyl formate, vinyl acetate, vinyl propionate, vinyl butyrate, vinyl octanoate, vinyl dodecanoate, vinyl stearate, and vinyl arachidonate; vinylsilane compounds such as vinyltrimethoxysilane; an unsaturated sulfonic acid or salts thereof; alkylthiols; vinylpyrrolidones; and the like), poly 4-methyl-1-pentene, and poly 1-butene; polyesters such as polyethylene terephthalate, polybutylene terephthalate, and polyethylene naphthalate; polyamides such as poly ε-caprolactam, polyhexamethyleneadipamide, and polymetaxylyleneadipamide; and polyvinylidene chloride, polyvinyl chloride, polystyrene, polyacrylonitrile, polycarbonate, and a polyacrylate. Such a thermoplastic polymer layer may be unstretched, or monoaxially or biaxially stretched or rolled. For use of retort containers, a polyamide, a polyester, or polypropylene among these polymers is preferably used on an outer layer side of a package in which food or the like is packed. Whereas, polypropylene is preferably used on an inner layer side.

Among these thermoplastic polymers, a polyolefin is preferred in terms of moisture resistance, mechanical characteristics, economic efficiency, heat sealing properties, and the like, whereas a polyamide and a polyester are preferred in terms of mechanical characteristics, heat resistance, and the like.

On the other hand, the adhesive polymer used for the z layer is not particularly limited as long as it enables adhesion between the layers, and suitably used are, for example, a polyurethane type or polyester type one-component or two-component curable adhesive and a carboxylic acid-modified polyolefin polymer. The carboxylic acid-modified polyolefin polymer is an olefin-derived polymer or copolymer that includes an unsaturated carboxylic acid or an anhydride thereof (e.g., maleic anhydride) as a copolymerization component; or a graft copolymer obtained by subjecting an unsaturated carboxylic acid or an anhydride thereof to grafting with an olefin-derived polymer or copolymer.

Examples of a method for obtaining the multilayered structure include an extrusion lamination method, a dry lamination method, a coinjection molding method, and a coextrusion molding method. The method, however, is not limited to these examples. Examples of the coextrusion molding method include a coextrusion lamination method, a coextrusion sheet molding method, a coextrusion inflation molding method, and a coextrusion blow molding method.

A sheet, a film, a parison, or the like having the multilayered structure obtained as described above can be reheated at a temperature of no greater than the melting point of a polymer contained, and monoaxially or biaxially stretched by, for example, a thermoforming method such as draw molding, a roll stretching method, a pantograph system stretching method, an inflation stretching method, or a blow molding method, to give a stretched molded product.

The multilayered structure is applicable to various uses, and for example, it can be suitably used for the uses exemplified for the crosslinked product described above. Especially, the multilayered structure can be suitably applied as a form of a retort container, taking advantage of excellent hot water resistance and bending resistance of a crosslinked product having the multilayer structure. In addition, the multilayered structure is suitably applicable also as a container for, for example, chemically active chemical goods or an agrichemical. Hereinafter, an aspect is described in which the multilayered structure is used as a retort container.

<Retort Container>

With use of the multilayered structure, a flexible retort container can be obtained that is formed of a comparatively thin multilayered structure having a total thickness of all layers (hereinafter, also merely referred to as "total layer thickness") of no greater than 300 μm. Generally, such a flexible retort container is processed into a form of a pouch or the like. Since this container is excellent in oxygen barrier properties, hot water resistance, and bending resistance and can be simply produced, it is useful for packaging a product that is highly sensitive to oxygen and is likely to deteriorate.

Such a multilayer film has a thickness of generally no greater than 300 μm as described above, more suitably no greater than 250 μm, and still more suitably no greater than 200 μm in light of maintaining flexibility of the film. On the other hand, the total layer thickness is suitably no less than 10 μm, more suitably no less than 20 μm, and still more suitably 30 μm, in consideration of mechanical characteristics as a container.

The retort container formed of a multilayer film having a total layer thickness of no greater than 300 μm can be produced from a multilayer film obtained by, for example, laminating a layer formed of the resin composition of the present invention and a thermoplastic resin layer according to a method such as dry lamination or coextrusion lamination.

When the retort container is produced from a multilayer film obtained by dry lamination, there can be used, as the multilayer film, an unstretched film, a monoaxially stretched film, a biaxially stretched film, and a rolled film, for example. Especially, a biaxially stretched polypropylene film, a biaxially stretched polyester film, and a biaxially stretched polyamide film are preferred in light of mechanical strength and heat resistance. When an unstretched film or a monoaxially stretched film is used, a laminated multilayer film can be reheated and monoaxially or biaxially stretched by, for example, a thermoforming method such as draw molding, a roll stretching method, a pantograph system stretching method, or an inflation stretching method to give a stretched multilayer film.

For sealing a resultant multilayer container, it is preferred to provide a layer formed of a heat sealable resin on the surface of at least one outermost layer in a step of producing the multilayer film. Examples of such a resin include polyolefins such as polyethylene and polypropylene.

The multilayer film thus obtained can be processed into, for example, a bag form, to provide a retort container that is filled with contents. The retort container is flexible and simple and is excellent in oxygen barrier properties, so that the retort container is useful for packaging contents that are likely to deteriorate in the presence of oxygen, particularly food as well as pet food, medical drug, and the like.

EXAMPLES

Hereinafter, an embodiment of the present invention is more specifically described by way of examples. The present invention, however, is not in any way limited by these examples. Here, quantitative terms are on mass basis unless otherwise stated in particular. Each measurement and evaluation in the examples and comparative examples was performed according to the following particulars.

(1) Gel Fraction

Pellets of a resin composition obtained in the following examples and comparative examples were subjected to melt extrusion with a 20 mmφ monoaxial extruder and a coat hanger die at 220° C. to give a monolayer film having a thickness of 20 μm. This monolayer film was introduced into an electron beam irradiator, and crosslinking was carried out by irradiation with an electron beam having an irradiation dose of 100 kGy at an accelerating voltage of 250 kV to give an irradiated monolayer film. The resultant irradiated monolayer film in an amount of 1 part by mass was dissolved under heating in 100 parts by mass of a mixed solvent of water (15% by mass) and phenol (85% by mass) at 60° C. for 8 hours, followed by separation into a solid matter and a filtrate by filtration. Next, the resultant solid matter was dissolved under heating in 100 parts by mass of 1,2-dichlorobenzene at 140° C. for 4 hours, followed by separation into a solid matter and a filtrate by filtration. The two resultant filtrates were each evaporated to dryness, and the solid matter residue (%) was calculated, which was defined as a gel fraction.

(2) Hot Water Resistance (Evaluation of Monolayer Film)

An irradiated monolayer film obtained in the same manner as in (1) was cut into a 10 cm square, sealed in a 12 cm square pouch together with 100 ml of water, subjected to a retort treatment at 135° C. for 60 minutes, and then taken out from the pouch. The appearance of the film was observed by visual inspection. In the inspection, the appearance of the film was evaluated according to the following criteria:

A: no dissolution of film entirely;
B: partial dissolution of film;
C: dissolution of film over a wide range; and
D: entire dissolution of film with original shape of film lost.

(3) Bending Resistance (Before Retorting)

An irradiated monolayer film obtained in the same manner as in (1) was subjected to humidity control under the conditions of 20° C./65% RH and to evaluation of bending resistance before retorting with use of a Gelbo Flex Tester. Specifically, first, an A4-sized film was made into a cylindrical form with a diameter of 3.5 in. The film was firmly held at both ends with an initial holding distance of 7 in and a holding distance during maximum bending of 1 in. The film was twisted at an angle of 440 degrees in the first stroke of 3.5 in and then subjected to reciprocal motion 160 times at a speed of 40 times/min for the other stroke of 2.5 in, the reciprocal motion being formed of repeated straight horizontal movements. Then, the number of pinholes were counted. This measurement was carried out three times, and an average value of the measurements was evaluated according to the following criteria, and the evaluation result was defined as the bending resistance before retorting:

A: less than 5 pinholes;
B: no less than 5 pinholes and less than 20 pinholes;
C: no less than 20 pinholes and less than 100 pinholes; and
D: no less than 100 pinholes.

(4) Bending Resistance (after Retorting)

An unstretched polypropylene film (CPP) was laminated on both sides of an irradiated monolayer film obtained in the same manner as in (1) with a polyurethane type two-component curable adhesive (Ad) interposed between the unstretched polypropylene films and the irradiated monolayer film to give an irradiated multilayer film (CPP 30 μm/Ad/EVOH layer (irradiated monolayer film) 20 μm/Ad/CPP 30 μm), the polyurethane type two-component curable adhesive being formed of TAKELAC A-520 and TAKENATE A-50 both manufactured by Mitsui Chemicals, Inc. An A4-sized pouch was manufactured using the resultant irradiated multilayer film, 800 ml of water was poured into the pouch, and the pouch was subjected to a retort treatment at 135° C. for 60 minutes. The retort-treated pouch was left to stand for 1 hour at 20° C./65% RH, then opened and dehydrated, and subjected to humidity control for 1 hour. Then, the pouch was evaluated for the bending resistance in the same manner as in (3) except that the reciprocal motion was conducted 1000 times and the pouch was evaluated according to the following criteria, and the evaluation result was defined as the bending resistance after retorting:

A: less than 3 pinholes;
B: no less than 3 pinholes and less than 10 pinholes;
C: no less than 10 pinholes and less than 20 pinholes; and
D: no less than 20 pinholes.

(5) OTR (Oxygen Transmission Rate)

With use of an irradiated monolayer film obtained in the same manner as in (1), OTR was measured. Specifically, the film was measured for the oxygen transmission rate (unit: cc/(m²·day·atm)) using an oxygen transmission quantity measurement apparatus ("MOCON OX-TRAN2/20" manufactured by Modern Controls, Inc.) under the conditions of a temperature of 20° C., a humidity on a side of oxygen supply of 65% RH, a humidity on a side of a carrier gas of 65% RH, an oxygen pressure of 1 atm, and a carrier gas pressure of 1 atm. Used as the carrier gas was a nitrogen gas containing 2 vol/% of a hydrogen gas.

(6) Extrusion Processability

Pellets of a resin composition obtained in the following examples and comparative examples were pelletized again at 230° C. using a 25 mmφ biaxial extruder. The degree of generation of a resin (die drool) attached to a die during the pelletization and stability of a strand were evaluated according to the following criteria:

A: no generation of die drool with stable strand;
B: generation of a little die drool with basically stable strand; and
C: generation of die drool with occasionally disarrayed strand.

(7) Appearance Characteristics

Generation of gel and granules of an irradiated monolayer film obtained in the same manner as in (1) and unevenness on a surface of the film were confirmed by visual inspection and evaluated according to the following criteria.

<Generation of Gel and Granules>
A: almost no gel and granules
B: some gel and granules
C: quite a lot of gel and granules
<Unevenness on Surface of Film>
A: almost no unevenness
B: some unevenness
C: quite a lot of unevenness In the following Examples 1 to 23 and Comparative Examples 1 to 6, EVOH, flexible resins, crosslinking agents, and hindered phenol compounds were used that had the following composition and physical properties.

<Ethylene-Vinyl Alcohol Copolymer (A)>
(A-1) EVOH: manufactured by Kuraray Co., Ltd., ethylene unit content: 27 mol %, degree of saponification: 99.8%, MFR: 4.0 g/10 min (in accordance with JIS K 7210: 2014; temperature 210° C., load 2160 g)
(A-2) EVOH: manufactured by Kuraray Co., Ltd., ethylene unit content: 44 mol %, degree of saponification: 99.8%, MFR: 3.3 g/10 min (in accordance with JIS K 7210: 2014; temperature 210° C., load 2160 g)
<Flexible Resin (B)>
<Acid-Modified Flexible Resin (b1)>
(b1-1) MAh-EP (maleic anhydride-modified ethylene-propylene copolymer):
"TAFMER MP0610" manufactured by Mitsui Chemicals, Inc., acid value: 6.1 mg KOH/g, MFR: 0.6 g/10 min (in accordance with JIS K 7210: 2014; temperature 210° C., load 2160 g)
(b1-2) MAh-EB (maleic anhydride-modified ethylene-butene copolymer):
"TAFMER MA8510" manufactured by Mitsui Chemicals, Inc., acid value: 5.5 mg KOH/g, MFR: 2.9 g/10 min (in accordance with JIS K 7210: 2014; temperature 210° C., load 2160 g)
(b1-3) MAh-SEBS (maleic anhydride-modified styrene-ethylene/butylene-styrene block copolymer): "Taftec M1911" manufactured by Asahi Kasei Corp., acid value: 1.9 mg KOH/g, MFR: 1.9 g/10 min (in accordance with JIS K 7210: 2014; temperature 210° C., load 2160 g)
<Unmodified Flexible Resin (b2)>
(b2-1) EP (ethylene-propylene copolymer): "TAFMER P0280" manufactured by Mitsui Chemicals, Inc., MFR: 5.4 g/10 min (in accordance with JIS K 7210: 2014; temperature 210° C., load 2160 g)
(b2-2) EB (ethylene-butene copolymer): "TAFMER A4085" manufactured by Mitsui Chemicals, Inc., MFR: 2.9 g/10 min (in accordance with JIS K 7210: 2014; temperature 210° C., load 2160 g)
(b2-3) SEBS (styrene-ethylene/butylene-styrene block copolymer): "Taftec H1041" manufactured by Asahi Kasei Corp., MFR: 1.8 g/10 min (in accordance with JIS K 7210: 2014; temperature 210° C., load 2160 g)
<Crosslinking Agent (C)>
(C-1) Trimethallyl isocyanurate (TMAIC)
(C-2) Trimethylolpropane diallyl ether (TMPDAE)
(C-3) Diallyl maleate (DAM)
(C-4) Pentaerythritol triallyl ether (PETAE)
(C-5) Trimethylolpropane trimethacrylate (TMPTMA)
(C-6) Triallyl cyanurate (TAC)
(C-7) Triallyl isocyanurate (TAIC)
(C-8) Diethylene tris-crotonamide (DETCA)
(C-9) Glycerin monoallyl ether (GMAE)
<Hindered Phenol Compound (D)>
(D-1) Pentaerythritol tetrakis[3-(3,5-di-tert-butyl-4-hydroxyphenyl)propionate]: "IRGANOX 1010" manufactured by BASF SE
(D-2) N,N'-hexamethylene bis[3-(3,5-di-tert-butyl-4-hydroxyphenyl)propanamide]: "IRGANOX 1098" manufactured by BASF SE Examples 1 to 23 and Comparative Examples 1 to 6

Using a 25 mmφ biaxial extruder, the aforementioned EVOH, flexible resin, crosslinking agent, and hindered phenol compound were melt kneaded at 210° C. at the ratio shown in Table 1 to prepare pellets of a crosslinkable resin composition. Table 2 shows evaluation results.

TABLE 1

| | Composition | | | | | | | | |
|---|---|---|---|---|---|---|---|---|---|
| | EVOH(A) | Flexible resin (B) | | | | Crosslinking agent (C) | | Hindered phenol compound (D) | |
| | | Acid-modified flexible resin (b1) | Unmodified flexible resin (b2) | Mass ratio | | | | | |
| | Type | Type | Type | (A)/(B) | (b1)/(b2) | Type | Amount added*1 | Type | Amount added*1 |
| Example 1 | A-1 | b1-1 MAh-EP | b2-1 EP | 80/20 | 20/80 | C-1 | 4 | — | — |
| Example 2 | A-1 | b1-1 MAh-EP | b2-1 EP | 70/30 | 20/80 | C-1 | 4 | — | — |
| Example 3 | A-1 | — — | b2-1 EP | 80/20 | 0/100 | C-1 | 4 | — | — |
| Example 4 | A-1 | b1-1 MAh-EP | b2-1 EP | 80/20 | 40/60 | C-1 | 4 | — | — |
| Example 5 | A-1 | b1-1 MAh-EP | b2-1 EP | 80/20 | 60/40 | C-1 | 4 | — | — |
| Example 6 | A-1 | b1-1 MAh-EP | b2-1 EP | 80/20 | 80/20 | C-1 | 4 | — | — |
| Example 7 | A-1 | b1-1 MAh-EP | — — | 80/20 | 100/0 | C-1 | 4 | — | — |
| Example 8 | A-1 | b1-2 MAh-EB | b2-2 EB | 80/20 | 20/80 | C-1 | 4 | — | — |
| Example 9 | A-1 | b1-3 MAh-SEBS | b2-3 SEBS | 80/20 | 20/80 | C-1 | 4 | — | — |
| Example 10 | A-1 | b1-1 MAh-EP | b2-1 EP | 80/20 | 20/80 | C-1 | 2 | — | — |
| Example 11 | A-1 | b1-1 MAh-EP | b2-1 EP | 80/20 | 20/80 | C-1 | 9 | — | — |
| Example 12 | A-1 | b1-1 MAh-EP | b2-1 EP | 80/20 | 20/80 | C-2 | 4 | — | — |
| Example 13 | A-1 | b1-1 MAh-EP | b2-1 EP | 80/20 | 20/80 | C-3 | 4 | — | — |
| Example 14 | A-1 | b1-1 MAh-EP | b2-1 EP | 80/20 | 20/80 | C-4 | 4 | — | — |
| Example 15 | A-1 | b1-1 MAh-EP | b2-1 EP | 80/20 | 20/80 | C-5 | 4 | — | — |
| Example 16 | A-1 | b1-1 MAh-EP | b2-1 EP | 80/20 | 20/80 | C-6 | 4 | — | — |
| Example 17 | A-1 | b1-1 MAh-EP | b2-1 EP | 80/20 | 20/80 | C-7 | 4 | — | — |
| Example 18 | A-1 | b1-1 MAh-EP | b2-1 EP | 80/20 | 20/80 | C-8 | 4 | — | — |
| Example 19 | A-1 | b1-1 MAh-EP | b2-1 EP | 80/20 | 20/80 | C-1 | 4 | D-1 | 2 |
| Example 20 | A-1 | b1-1 MAh-EP | b2-1 EP | 80/20 | 20/80 | C-1 | 4 | D-2 | 0.1 |
| Example 21 | A-1 | b1-1 MAh-EP | b2-1 EP | 80/20 | 20/80 | C-1 | 4 | D-2 | 2 |
| Example 22 | A-1 | b1-1 MAh-EP | b2-1 EP | 80/20 | 20/80 | C-1 | 4 | D-2 | 6 |
| Example 23 | A-2 | b1-1 MAh-EP | b2-1 EP | 80/20 | 20/80 | C-1 | 4 | — | — |
| Comparative Example 1 | A-1 | — — | — — | 100/0 | — | C-1 | 4 | — | — |
| Comparative Example 2 | A-1 | b1-1 MAh-EP | b2-1 EP | 95/5 | 20/80 | C-1 | 4 | — | — |
| Comparative Example 3 | A-1 | b1-1 MAh-EP | b2-1 EP | 50/50 | 20/80 | C-1 | 4 | — | — |
| Comparative Example 4 | A-1 | b1-1 MAh-EP | b2-1 EP | 80/20 | 20/80 | C-1 | 0.2 | — | — |
| Comparative Example 5 | A-1 | b1-1 MAh-EP | b2-1 EP | 80/20 | 20/80 | C-1 | 12 | — | — |
| Comparative Example 6 | A-1 | b1-1 MAh-EP | b2-1 EP | 80/20 | 20/80 | C-9 | 4 | — | — |

*1 Amount (part by mass) of crosslinking agent or hindered phenol compound relative to total 100 parts by mass of EVOH and flexible resin

TABLE 2

| | Gel fraction (%) | Hot water resistance | Bending resistance | | OTR (cc/m2·day·atm) | Extrusion processability | Appearance characteristics | |
|---|---|---|---|---|---|---|---|---|
| | | | Before retorting | After retorting | | | Generation of gel and granules | Unevenness on surface of film |
| Example 1 | 54 | A | A | A | 0.6 | A | B | A |
| Example 2 | 57 | A | A | A | 0.8 | B | B | A |
| Example 3 | 48 | A | B | B | 0.7 | C | B | A |
| Example 4 | 55 | A | A | A | 0.6 | A | B | A |
| Example 5 | 58 | A | A | A | 0.5 | A | C | A |
| Example 6 | 60 | A | B | B | 0.5 | A | C | A |
| Example 7 | 61 | A | B | B | 0.5 | A | C | B |
| Example 8 | 53 | A | A | A | 0.6 | A | B | A |
| Example 9 | 55 | A | A | A | 0.6 | A | B | A |
| Example 10 | 44 | A | A | A | 0.6 | A | B | A |
| Example 11 | 60 | A | B | B | 0.7 | A | C | B |
| Example 12 | 31 | B | A | B | 0.7 | A | B | B |
| Example 13 | 36 | B | A | B | 0.7 | A | B | B |
| Example 14 | 41 | A | A | B | 0.6 | A | B | B |
| Example 15 | 44 | A | A | B | 0.6 | A | B | B |
| Example 16 | 49 | A | A | A | 0.6 | A | B | B |
| Example 17 | 56 | A | A | A | 0.6 | A | B | B |
| Example 18 | 57 | A | A | A | 0.6 | A | B | A |
| Example 19 | 54 | A | A | A | 0.6 | A | A | B |
| Example 20 | 55 | A | A | A | 0.6 | A | B | A |
| Example 21 | 52 | A | A | A | 0.6 | A | A | A |
| Example 22 | 54 | A | A | A | 0.7 | A | A | B |

TABLE 2-continued

| | Gel fraction (%) | Hot water resistance | Bending resistance Before retorting | Bending resistance After retorting | OTR (cc/m2·day·atm) | Extrusion processability | Appearance characteristics Generation of gel and granules | Appearance characteristics Unevenness on surface of film |
|---|---|---|---|---|---|---|---|---|
| Example 23 | 51 | A | A | A | 1.6 | A | B | A |
| Comparative Example 1 | 48 | A | D | D | 0.2 | A | B | A |
| Comparative Example 2 | 51 | A | C | C | 0.3 | A | B | A |
| Comparative Example 3 | 59 | C | A | B | >10 | C | C | A |
| Comparative Example 4 | 8 | D | A | C | 0.6 | A | A | A |
| Comparative Example 5 | 63 | A | C | C | 0.9 | A | C | C |
| Comparative Example 6 | 3 | D | A | D | 0.8 | A | A | C |

As is clear from the results in Table 2, each film obtained using the resin composition according to the examples exhibited a result of having both excellent hot water resistance and excellent bending resistance. To the contrary, the film obtained using the resin composition of the comparative examples exhibited a result inferior in either of the hot water resistance and the bending resistance.

Subsequently, a stretched polyamide film (ON) and an unstretched polypropylene film (CPP) were laminated on both sides of the irradiated monolayer film obtained in Example 1 and Comparative Example 1 with a polyurethane type two-component curable adhesive (Ad) interposed between each of the stretched polyamide film and the unstretched polypropylene film and the irradiated monolayer film to give an irradiated multilayer film ((outer layer) ON 15 μm/Ad/EVOH layer (irradiated monolayer film) 20 μm/Ad/CPP 50 μm (inner layer)), the polyurethane type two-component curable adhesive being formed of TAKE-LAC A-520 and TAKENATE A-50 both manufactured by Mitsui Chemicals, Inc. Next, the resultant irradiated multilayer film was subjected to bending processing in the same manner as in (3). A 10 cm square pouch was manufactured using the thus obtained irradiated multilayer film that had undergone the bending processing, 80 ml of a refried bean paste was poured into the pouch, and the pouch was subjected to a retort treatment at 135° C. for 60 minutes. Then, the pouch was stored for 1 month under the conditions of 40° C. and 90% RH, and the appearance of the pouch was observed by visual inspection. The pouch obtained using the film of Example 1 was entirely uniform and hardly showed color change, whereas the pouch obtained using the film of Comparative Example 1 showed blackening around a bent portion and showed color unevenness entirely.

INDUSTRIAL APPLICABILITY

A resin composition of the present invention can realize a crosslinked product having excellent hot water resistance and bending resistance. Therefore, the resin composition of the present invention can be suitably used for producing food packaging materials and other packaging materials. Further, the resin composition of the present invention does not require special extrusion conditions and can be economically provided to be applied to various packing materials.

The invention claimed is:

1. A resin composition comprising an ethylene-vinyl alcohol copolymer (A), a flexible resin (B), and a crosslinking agent (C) having two or more polymerizable groups, with the crosslinking agent (C) in an amount of 0.5 to 10 parts by mass relative to a total 100 parts by mass of the ethylene-vinyl alcohol copolymer (A) and the flexible resin (B), the flexible resin (B) being a styrene thermoplastic elastomer, an α-olefin copolymer, or a combination thereof, and the resin composition having a mass ratio [(A)/(B)] between the ethylene-vinyl alcohol copolymer (A) and the flexible resin (B) of 90/10 to 65/35.

2. The resin composition according to claim 1, wherein the mass ratio [(A)/(B)] is 90/10 to 75/25.

3. The resin composition according to claim 1, wherein the flexible resin (B) is a mixture of an acid-modified flexible resin (b1) with an unmodified flexible resin (b2), and the flexible resin (B) has a mass ratio [(b1)/(b2)] between the acid-modified flexible resin (b1) and the unmodified flexible resin (b2) of 99/1 to 1/99.

4. The resin composition according to claim 3, wherein the mass ratio [(b1)/(b2)] is 67/33 to 5/95.

5. The resin composition according to claim 3, wherein the mass ratio [(b1)/(b2)] is 50/50 to 10/90.

6. The resin composition according to claim 1, wherein the flexible resin (B) is one selected from the group consisting of a styrene thermoplastic elastomer and an α-olefin copolymer.

7. The resin composition according to claim 1, wherein the crosslinking agent (C) has three or more polymerizable groups.

8. The resin composition according to claim 1, wherein the crosslinking agent (C) is a triazine derivative.

9. The resin composition according to claim 8, wherein the triazine derivative is triallyl cyanurate, triallyl isocyanurate, trimethallyl isocyanurate, or a polymer thereof.

10. The resin composition according to claim 1, wherein the crosslinking agent (C) has as many amide groups as or more amide groups than the polymerizable groups.

11. The resin composition according to claim 10, wherein the crosslinking agent (C) is represented by the following formula (1):

[Formula 1]

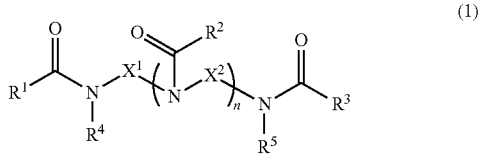

wherein, $R^1$, $R^2$, and $R^3$ are each independently an unsaturated hydrocarbon group having 2 to 8 carbon atoms; $R^4$ and $R^5$ are each independently a hydrogen atom or an alkyl group having 1 to 4 carbon atoms; $X^1$ and $X^2$ are each independently an alkanediyl group having 1 to 6 carbon atoms; n is an integer of 0 to 4; and when n is an integer of no less than 2, a plurality of $R^2$s are each independently an unsaturated hydrocarbon group having 2 to 8 carbon atoms and a plurality of $X^2$s are each independently an alkanediyl group having 1 to 6 carbon atoms.

12. The resin composition according to claim 1, further comprising a hindered phenol compound (D) having an ester bond or an amide bond in an amount of 0.2 to 5 parts by mass relative to the total 100 parts by mass of the ethylene-vinyl alcohol copolymer (A) and the flexible resin (B).

13. The resin composition according to claim 12, wherein the hindered phenol compound (D) has the amide bond.

14. The resin composition according to claim 1, wherein an ethylene-vinyl alcohol copolymer (A) has the ethylene unit content of 20 to 60 mol % and the degree of saponification of 80 mol % or more.

15. The resin composition according to claim 1, being for crosslinking with an activated energy ray.

16. A crosslinked product obtained from the resin composition according to claim 1.

17. The crosslinked product obtained from the resin composition according to claim 13.

18. A film formed of the crosslinked product according to claim 16.

19. The film according to claim 18, wherein the film is a multilayered structure.

* * * * *